United States Patent
Bono et al.

(10) Patent No.: US 8,220,274 B2
(45) Date of Patent: Jul. 17, 2012

(54) EMISSION REDUCTION METHOD FOR USE WITH A HEAT RECOVERY STEAM GENERATION SYSTEM

(75) Inventors: Robert Bono, Dana Point, CA (US); Rajashekharam V. Malyala, Camarillo, CA (US); Alec Miller, Pasadena, CA (US); Stephen J. Golden, Santa Barbara, CA (US)

(73) Assignee: Johnson Matthey Inc., Wayne, PA (US)

( * ) Notice: Subject to any disclaimer, the term of this patent is extended or adjusted under 35 U.S.C. 154(b) by 942 days.

(21) Appl. No.: 12/214,541

(22) Filed: Jun. 19, 2008

(65) Prior Publication Data
US 2009/0282803 A1 Nov. 19, 2009

Related U.S. Application Data

(60) Provisional application No. 61/127,708, filed on May 15, 2008.

(51) Int. Cl.
F02C 6/00 (2006.01)
(52) U.S. Cl. .......... 60/772; 60/39.182; 60/39.5; 122/7 R
(58) Field of Classification Search ............... 60/39.182, 60/39.5, 772, 784; 122/7 R, 7 B
See application file for complete search history.

(56) References Cited

U.S. PATENT DOCUMENTS

| | | | |
|---|---|---|---|
| 4,353,206 A * | 10/1982 | Lee | ............................ 60/39.182 |
| 4,353,207 A | 10/1982 | Lee | |
| 4,833,113 A | 5/1989 | Imanari et al. | |
| 4,875,436 A | 10/1989 | Smith et al. | |
| 4,961,917 A | 10/1990 | Byrne | |
| 5,116,586 A | 5/1992 | Baacke et al. | |
| 5,224,334 A * | 7/1993 | Bell | ................................ 60/274 |
| 5,461,853 A | 10/1995 | Vetterick | |
| 5,900,222 A | 5/1999 | Ito et al. | |
| 6,284,211 B1 | 9/2001 | Miyadera et al. | |
| 7,191,598 B2 | 3/2007 | Coleman et al. | |
| 7,361,321 B2 | 4/2008 | Rocha et al. | |
| 2004/0045513 A1 | 3/2004 | McNertney, Jr. et al. | |
| 2005/0034445 A1 | 2/2005 | Radovich | |
| 2005/0159304 A1 | 7/2005 | Ichiki et al. | |
| 2006/0228283 A1 | 10/2006 | Malyala et al. | |

OTHER PUBLICATIONS

Byrne et al., "Selective Catalytic Reduction of NOx Using Zeolitic Catalysts for High Temperature Applications", Catalysis Today, 13, 1992, 33-42.
Kohl, et al., "Gas Purification", $5^{th}$ edition, 1997, 894-922.
California Environmental Protection Agency, Air Resources Board, Report to the Legislature, "Gas-Fired Power Plant NOx Emission Controls and Related Environmental Impacts", May 2004.
Environmental Catalysts & Systems, "Retrofit Application and Operation of the Shell Low Temperature SCR Technology on Gas Turbines, Ethylene Cracker Furnaces and Process Heaters", ICAC Forum 2002, Houston, Texas, 1-13.
BASF, Innovative Emissions Control Solutions, Nov. 19, 2007.

* cited by examiner

Primary Examiner — Louis Casaregola
(74) Attorney, Agent, or Firm — Jimmie D. Johnson

(57) ABSTRACT

A system and method of maintaining an optimal temperature range for a catalyst section in a HRSG comprising placing a portion of the exhaust stream in a heat exchanger and superheater, diverting a second portion around the heat exchanger and superheater, combining the two portions and contacting the two portions with a catalyst section. Alternatively, a system of heat exchangers are employed to address the fluctuating exhaust temperature caused by the intermittent use of the duct burners.

20 Claims, 6 Drawing Sheets

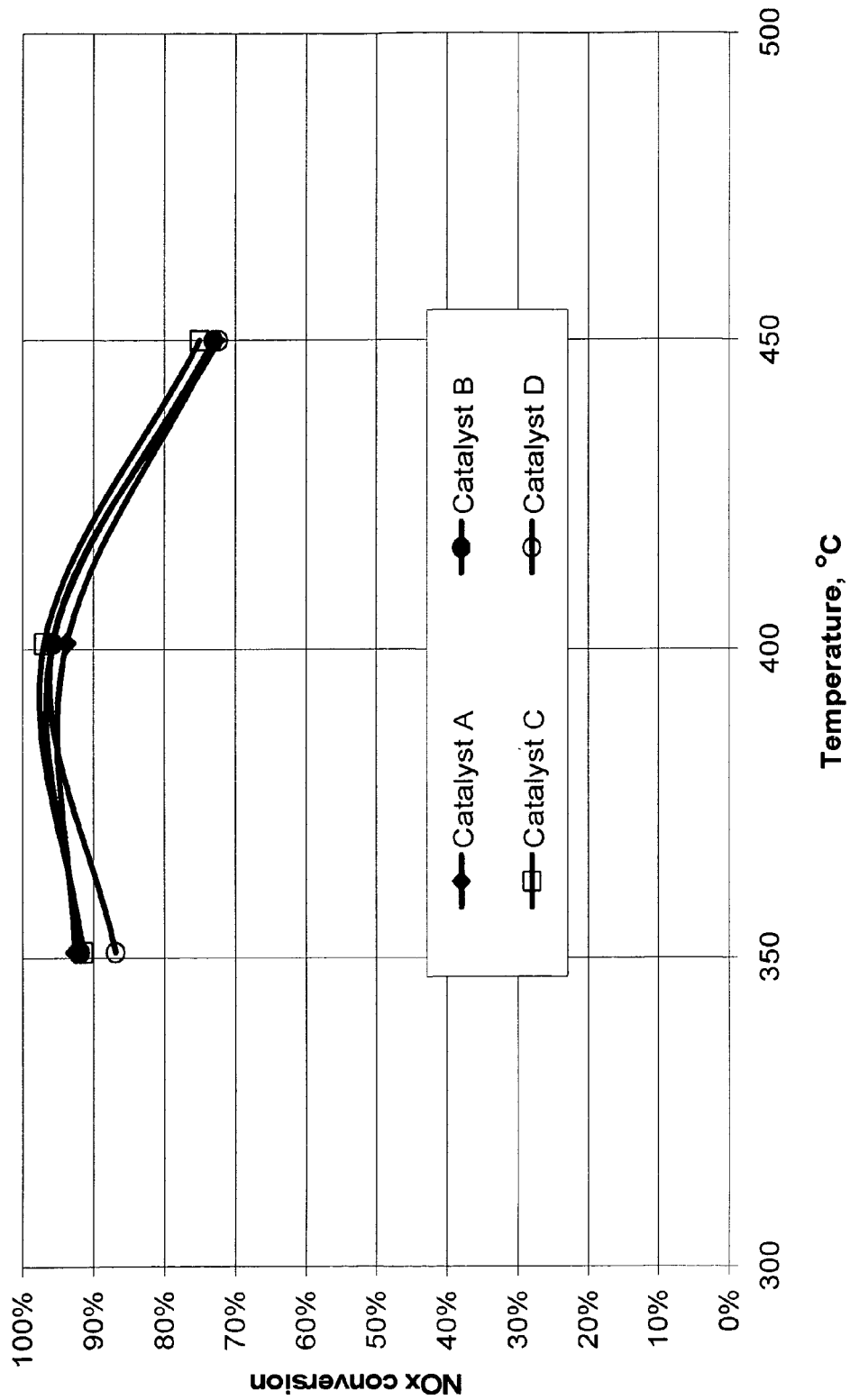
Figure 1: NOx conversion versus temperature for HC-SCR catalysts

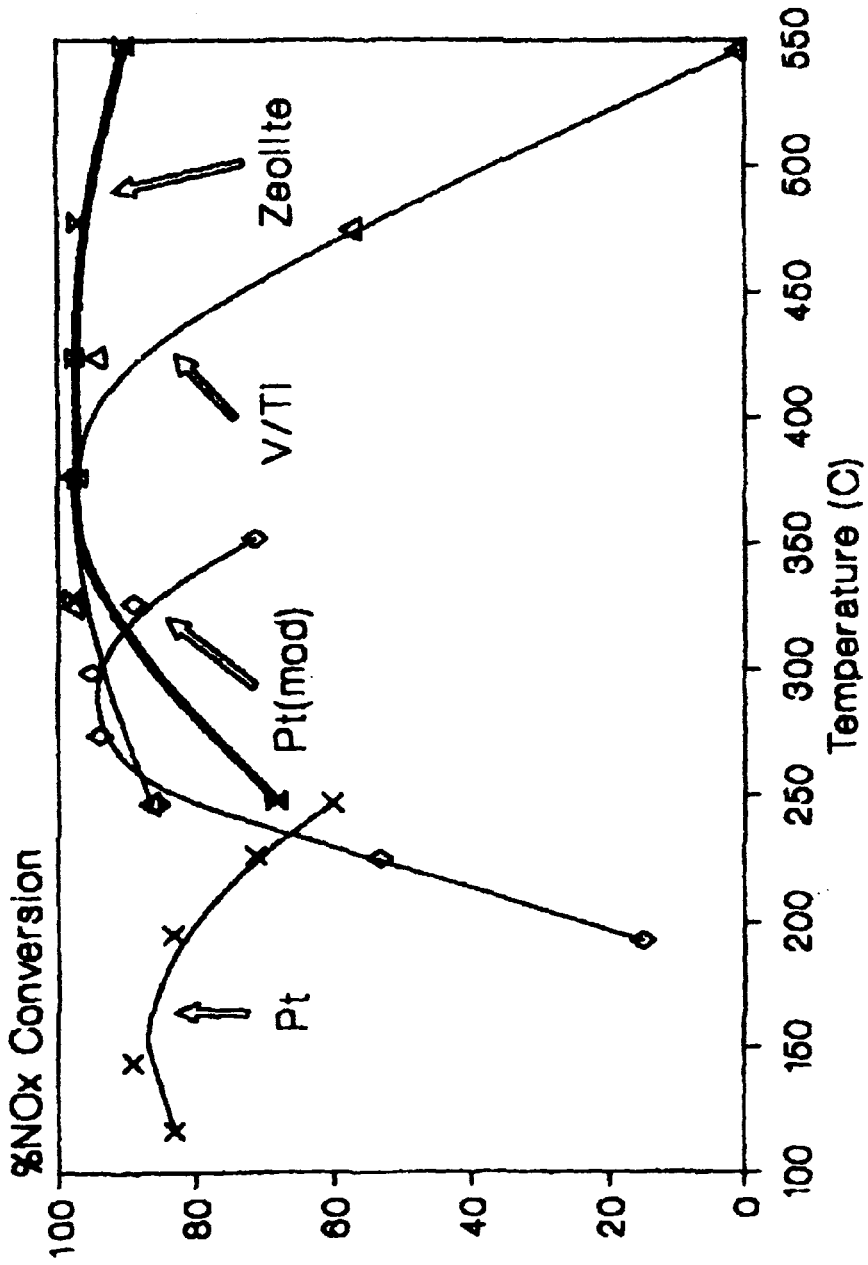
Figure 2: Temperature window for some commercial ammonia-SCR catalysts
Data @30K VHSV; 1.0 NH3/NOx; 10% O2

EMISSION REDUCTION METHOD FOR USE WITH A HEAT RECOVERY STEAM GENERATION SYSTEM

RELATED APPLICATIONS

This application is a continuation-in-part of U.S. Provisional Application No. 61/127,708 filed May 15, 2008, which is herein incorporated by reference in its entirety.

FIELD OF THE INVENTION

This invention relates to a system and method for maintaining a workable temperature range for a catalyst system in a heat recovery steam generator ("HRSG") system. These methods and systems are employed to reduce the NOx and CO emissions from the exhaust stream of a combined cycle gas turbine where in a waste heat boiler for recovering the steam (HRSG type) is used. The invention relates to means to provide the SCR catalyst the desired temperature window where it performs (preferably optimally), without sacrificing the HRSG efficiency.

Gas turbines are used to generate electricity. Modern gas turbines are equipped with dual fuel capability and can run both on natural gas or other types of fuels such as diesel fuel, middle distillate, jet fuel etc.

There are two ways in which gas turbines may operate: simple cycle mode or a combined cycle mode. In a simple cycle operation, the exhaust from the gas turbine is ducted out through a stack. In a combined cycle operation, the exhaust stream's heat is utilized typically to generate steam and/or hot water. The steam generated in a combined cycle mode can be used to run a steam turbine to improve the efficiency of the overall process or can be used as process steam. The process of removing waste heat from the exhaust stream of the gas turbine is typically carried out by HRSG systems. HRSG's are also sometimes referred to as waste heat boilers.

The exhaust stream (also referred to as "exhaust stream") coming out such combined cycle gas turbines is typically in the range of about 500° F. to about 1100° F., typically about 825° F. to about 1100° F. Stack temperatures of combined cycle gas turbines (measured at the exit of the stack) seldom exceed about 350° F. In a typical combined cycle installation, the HRSG system is located after the gas turbine and before the stack. HRSG systems utilize the heat from the gas turbine exhaust stream, which would otherwise be wasted, thereby improving the overall energy efficiency of the turbine installation.

Such operations are extremely beneficial for installations aimed at generating maximum output from the turbines and/or when there is a constant requirement to generate electricity and use steam. Significant know-how exists in the use of HRSG behind turbines for the purpose of generating steam. Several manufacturers provide HRSG systems for combined cycle gas turbine applications.

HRSG's are often modularized and may have multiple heat exchangers. Some modular HRSG's consist of three major components: the Evaporator, Superheater, and Economizer, others include other types of heat exchangers. The different components are put together to meet the operating requirements of the unit. Often times the three components in the HRSG are also referred to as an LP (low pressure) section, a reheat/IP (intermediate pressure) section, and an HP (high pressure) section. Each section has a steam drum and an evaporator section where water is converted to steam. This steam then passes through super heaters to raise the temperature and pressure past the saturation point.

HRSGs are often packaged and designed to be shipped as a fully assembled unit from the factory. The packaged HRSG may have water-wall tubes (or membrane wall-tubes). Duct burners may then also be employed to allow for higher supplemental firing and better overall efficiency.

Some HRSGs include supplemental, or duct, firing. These additional burners (referred to as "duct burners") provide additional energy to the HRSG, which produces more steam. Generally, the use of duct firing produces more steam or hot water output.

In a typical combined cycle installation with a HRSG, the HRSG is located between the turbine exit and the stack. The entrance of the HRSG is from the turbine side, and the temperature from the entrance to the exit of the HRSG can vary from 1100° F. to 300° F., or more commonly from about 1000° F. to about 500° F.

HRSGs can also have diverter also called (by-pass) mechanisms to regulate in the inlet flow into the HRSG from the turbine. These by-pass mechanisms are typically designed to divert the entire flue gas around the HRSG, such that the gas turbine can continue to operate when there is no steam demand or if the HRSG needs to be taken offline for maintenance purposes. U.S. Pat. Nos. 5,4618,53 and 7,191,598 disclose how a by-pass can be installed in a combined cycle application.

Combustion of fuel in a turbine and/or the duct burners inside the HRSG, lead to high temperatures in the exhaust stream with harmful emissions. At high temperatures, nitrogen and oxygen in air can combine to form noxious compounds (e.g. without limitation NO and $NO_2$). Nitrogen oxide and nitrogen dioxide are together commonly referred to as NOx. Also, the partial combustion of fuel inside the turbine and/or duct burners leads to formation of carbon monoxide (CO) and un-burnt hydrocarbons in addition to $CO_2$ and water vapor.

Several regulatory agencies around the world have stringent emission requirements of NOx, CO and un-burnt hydrocarbons from the use of gas turbines. As a result, significant improvements have made and have been applied successfully in commercial installations worldwide where gas turbines are used. Both combustion and post combustion related technologies have been applied for the purpose of removing harmful pollutants from gas turbine exhausts (also called "exhaust streams"). Most modern turbines generate 25 ppm of NOx and are required to reduce NOx emissions significantly below what they make. Stringent regulations in states such as California and Massachusetts require NOx in the exhaust from the stack to be no more than 2 ppm.

When a HRSG is used, and the gas turbine is expected to meet certain emission requirements, it is typical to install an emission reduction catalyst inside the HRSG at a suitable location where the temperature of the exhaust stream that needs to be treated allows the catalyst to function. However, this location of the catalyst typically has a temperature inconsistent with its optimal performance level.

SCR Technology

The most widely known method of removing NOx pollutants in an exhaust stream is the use of selective catalytic reduction ("SCR") technology. In this technology, a reducing agent (such as ammonia) is injected into the flue gas and a catalyst is used to allow the reaction between the injected ammonia and NOx present in the exhaust stream, to form harmless nitrogen and water. Such catalysts are commonly referred to as ammonia SCR catalysts. U.S. Pat. Nos. 4,833, 113, and 4,961,917 (herein incorporated by reference) describe the use of such catalysts for removing NOx pollutants from exhaust streams.

In the three (described herein) SCR catalyst technologies (vanadia titania, high temperature and low temperature catalysts) ammonia is preferably used as a reducing agent. Ammonia is injected and mixed with the exhaust streams from the turbine before the SCR catalyst for the purpose of NOx reduction. Ammonia is a toxic gas. Ammonia is either used in its anhydrous form (gaseous ammonia) or in liquid form. Ammonia is injected into the exhaust of the turbine before the SCR catalyst for the purpose of NOx removal, so that overall NOx levels are below the allowed limits for any particular commercial installation. When liquid ammonia is used, typical concentration of the liquid will have 19% by weight of ammonia in water or 29% by weight of ammonia in water as allowed by permit regulations worldwide. Liquid ammonia may be vaporized prior to injection to generate ammonia gas from the liquid and the vaporized gaseous ammonia is then injected before the catalyst for NOx removal. Ammonia generating compounds such as urea are also used as reducing agents in such ammonia SCR catalyst technology.

The most common type of SCR catalyst used in combined cycle gas turbine applications is a vanadia titania catalyst. This catalyst technology performs best in the temperature window of 650-750° F. If the temperature is below 650° F., the catalyst is under utilized, leading to excess NOx and ammonia emissions. If the temperature is above 750° F., $NH_3$ can be oxidized on the catalyst and forms NOx, which increases the overall NOx thus produced. As noted previously, temperature inside an HRSG can vary from <500° F. to >1000° F. as opposed to the optimal catalyst performance window.

Economizer

Some prior art processes include the use of SCR catalysts in the exhaust duct of a turbine. In order to obtain the appropriate broad temperature window for the SCR catalyst, US Patent Application Publication No. 20040045513 describes a passive method for splitting the economizer in two and placing a catalyst between the two economizers, so the SCR catalyst (e.g. a standard V/TiO2 type) is maintained at a suitable but broad (not the narrow optimal range) temperature range. The first economizer ensures that the SCR catalyst is at its optimal temperature range under most operating conditions, while the second economizer is designed to further cool the exhaust gas to recapture all thermal efficiency, before the exhaust exits the stack. This application, however, does not address a method of removing the additional heat in the presence of duct firing.

In this prior art embodiment, there is no active feedback temperature loop. The exhaust temperature with and without duct firing can vary about 300 to 500° F. For example, it the exhaust without duct firing is about 800 F at the first economizer section, it can easily be greater than 1100 F under duct firing conditions at the same location. If the SCR catalyst has an optimal temperature range of about 700 F, cooling from 800 F (without duct firing) or 1100 F (with duct firing), would be required for optimal performance. The first economizer for cooling from 800 F to 700 F cannot be the same as the economizer required to cool from 1100 to 700 F. The present invention has the advantage of allowing narrow temperatures ranges (the optimal range) for the SCR catalyst even when the process conditions vary (e.g. duct firing or no duct firing). This helps emission reduction and overall efficiency. Conveniently, in the present invention, a CO catalyst may also be located before or after the SCR catalyst, preferably in the same zone where the SCR catalyst is located for CO abatement when necessary or desired.

High Temperature SCR

One known way of responding to the efficiency and emission issue is the use of "high temperature SCR catalysts" before the HRSG, but after the turbine. U.S. Pat. Nos. 4,961,917, 5,900,222, and 5,116,586, and U.S. Published Application No. 2005/0159304 (herein incorporated by reference) disclose the use of such high temperature SCR catalysts. While this appears to be an attractive solution, the temperature of the exhaust is so hot (around 1000° F.) which in turn impacts the longevity of such high temperature catalysts, forcing them to be replaced more frequently than catalyst placed in a lower temperature zone. Also, the high temperature SCR catalysts are not hydrothermally stable. Exhaust streams have around 10% water vapor typically. In SCR applications behind gas turbines, a catalyst is typically expected to work for more than 3 years or 24,000 hours without being replaced. This means that during operation of the turbine over this entire time period, the catalyst has to perform and meet emission requirements, which is difficult. These high temperature SCR catalysts are typically zeolite based catalysts. It is well known that the zeolite component which is the most active component in high temperature SCR catalysts, deactivate or degrade at a much faster rate in the presence of water vapor at temperatures around 1000° F.

Low Temperature SCR

Another known way of responding to this issue is the use of low temperature SCR catalysts. U.S. Pat. No. 4,875,436 (herein incorporated by reference) mentions some of the problems associated with locating a typical vanadia titania catalyst inside an HRSG, due to the broad temperature range inside an HRSG. Therefore, this prior art patent discloses the location of a low temperature SCR catalyst after the HRSG, in a section that is after the HRSG economizer and before the stack exit, where temperatures are close to 350° F. This is a more cost effective solution especially for existing installations or retrofit applications (combined cycle with HRSG), to meet current and future emission requirements, without having a need to replace and/or modify the existing HRSG. Their invention also disclosed uses a precious metal based catalyst with ammonia for the purpose of NOx removal from combined cycle gas turbines, where the SCR catalyst is located after the HRSG economizer but before the stack exit. However, precious metal catalysts are expensive. In addition, it is well known that precious metal based catalysts are extremely unselective for NOx reduction to nitrogen via SCR. Furthermore, as the temperature is low, a significant amount of catalyst is required. CRI, a catalyst company which is a division of Shell Company, performed such installations in combined cycle gas turbine applications and their commercial system is known as the "Shell DeNOx system" or "SDS". They presented a paper at the 2002 ICAC meeting forum held in Houston (herein incorporated by reference), wherein they disclose some disadvantages of their system. Disadvantages are associated with low temperature operation (<420° F.) requiring large amount of catalyst and associated reactor housing.

While the above three technologies describe the use of SCR catalysts for the purpose of NOx removal, CO is removed using a CO catalyst to meet CO emission goals.

Unlike SCR, for CO catalyst there is no need to inject any reagent. When a CO catalyst is used for the purpose of removing CO, the CO catalyst is located before the ammonia injection grid. It is also known that the when CO is located upstream of the ammonia injection grid, it not only helps to remove CO, but also helps to structure the flow for a better treatment by the downstream SCR for NOx removal.

Excess Catalyst

Another known way of responding to the issue of the mismatch in HRSG temperature v. optimal temperature for catalyst performance is to use large excess amount of catalyst (which can be as high as 3 times that that it is required) to guarantee emission reduction and catalyst longevity because the minimum or maximum temperature is well outside the limits of the catalyst performance window. This is costly; not only more catalyst is used (creating higher cost and backpressure), but also, excess space and surrounding structure is needed.

Ammonia Slip

Since ammonia is a toxic gas used with SCR catalysts, in addition to the above NOx and CO emission requirements, gas turbine users are also required to meet certain ammonia emission requirements. While most of the ammonia is consumed for NOx reduction, there is still some un-reacted ammonia that escapes through the exhaust stream and reaches the atmosphere through the stack. This is commonly known as "ammonia slip". Typical regulations in the USA allow gas turbine users to emit no more than 10 ppm of $NH_3$ through their stack. More stringent regulations in states such as California and Massachusetts are forcing ammonia regulations not to exceed 2 ppm slip. Ammonia transportation, handling and permit issues also exist due to the toxic nature of ammonia. A report on "Gas Turbine Emissions" to California Legislature in May 2004 (herein incorporated by reference) mentions some of the increasing ammonia emission trends and recommends the development of more environmentally friendlier emission control technologies for gas turbine emission reductions.

HC Reducing Agents

With a close view on ammonia emissions, the drive has been to invent technologies that do not use ammonia for gas turbine emission reductions. Recent work has shown that hydrocarbons can be injected into exhausts and mixed with the exhaust and can be treated with suitable catalysts. Such SCR catalysts are known as hydrocarbon SCR catalysts or HC-SCR's. U.S. Pat. No. 6,284,211 and U.S. Published Application No. 2006/0228283 (herein incorporated by reference) describe the use of such catalysts for the purpose of NOx reduction especially from gas turbines. However, many reports indicate that the peak performance of such catalysts is in the temperature window of 700-815° F., and that this performance significantly declines outside of that narrow temperature window. Since the HRSG's temperature range is anywhere from about 500° F.-about 1000° F., it is not possible to locate such HC-SCR catalyst inside a HRSG, such that the HC-SCR will meet desired emission reduction using currently known methods.

By passing the entire exhaust stream in a HRSGs is also practiced as taught in U.S. Pat. No. 7,191,598 (herein incorporated by reference). Such by-passing is done, typically when there is no significant steam requirement from a combined cycle unit and/or when the HRSG needs to be shut down for maintenance purposes. The use of duct burners is also common in HRSG's. Duct burners heat the exhaust stream to higher temperatures in a cheap way, and the heat is drawn by the downstream HRSG to increase the steam output from the HRSG's. Duct burners are typically located at the exit of the turbine and the entrance of the HRSG's. Exhaust stream re-burn is also practiced as taught in U.S. Pat. No. 5,461,853 (herein incorporated by reference) for the purpose of improving overall efficiency and some emission reductions, achieved via the operation of the duct burners.

Thus, the turbine combined with HRSG's leads to several different operation modes in a combined cycle application. It is not necessary in a HRSG, that duct burners are fired continuously. Rather, it is dictated by the overall steam requirement and efficiency requirements of the plant. When a typical ammonia SCR or HC-SCR catalyst is located inside a HRSG, the exhaust temperature that the catalyst is subject to significantly varies as operating conditions vary. For example, when the catalyst temperature is around 600° F. without an operating duct burner, an operating duct burner can easily increase the catalyst temperature by several hundred degrees. When this is coupled with turbine load variations, the temperature window in the HRSG can vary significantly, well outside the optimal and maximum limits of the catalysts. This results in significant stress on the catalyst, damaging it faster than expected.

Traditionally HRSG's have been designed in order to meet the steam requirements of the customer. The requirements include, among others, the amount, pressure, and temperature of the steam. Using this input information, the HRSG engineer develops a design, which includes elements of the HRSG system such as the reactor size, tube bank(s) design, and duct fired burners. In an application where emission control catalysts are required, a space is created between tube banks, where the catalyst can be installed. The temperature of the flue gas in this zone is a result of the design of the HRSG, and can fall within a broad range of about 300° F. to about 1100° F., typically about 500° F. to about 900° F.

Additionally, the temperature of this zone changes in real time, as it is influenced by various factors such as the turbine load (the electrical load on the turbine), the amount of steam which is required (which can vary minute to minute), and the use of duct fired burners. Thus, the temperature of the traditional zone which is allocated to emission control catalysts tends to both broad and highly variable during turbine operation.

Traditionally, no attempt is made in prior art to create a narrow, stable temperature zone which can be guaranteed to exist across all turbine/HRSG conditions. Because many catalysts have a narrow temperature range at which they perform to their maximum capability, the ability to create this narrow, stable temperature zone is beneficial to the performance of the catalyst. Furthermore, when designed with the turbine and HRSG operating parameters in mind, this zone can allow for both optimal performance of the catalyst, as well as optimal performance of the HRGS/turbine in terms of electrical generation, steam production (quantity and quality), and overall energy efficiency (heat recovery) of the HRSG system.

By way of example, some catalysts have narrower operating temperature ranges than others. The Hydrocarbon based SCR catalyst, by way of non-exclusive example, operates optimally in the range of 715° F. to 815° F., a narrow temperature window. In order for this catalyst to be used in a HRSG application, this catalyst must be placed in flue gas of this temperature, under all firing and HRSG conditions. No method of providing this narrow, permanent temperature zone exists in the prior art.

SUMMARY OF THE INVENTION

The purpose of this patent is to achieve a narrow temperature zone to suit the catalyst's maximum performance window at all turbine/HRSG conditions. Additional benefits of this invention include the ability to minimize the amount of the catalyst which is used, which can reduce the size of the reactor, and hence the cost of the HRSG system.

This invention regulates the temperature in a specified area of the HRSG so that the catalysts in the catalyst section can be optimally active. There are two ways of accomplishing this regulated temperature zone. First, a by-pass mechanism is located in the HRSG, which allows the exhaust stream, or a position thereof, to by-pass one or more heat exchangers and one or more superheaters. This by-pass amount is controlled so that the exhaust stream, as it enters the catalyst sector, is in the optimal temperature for the catalyst. A second alternative is positioning a heat exchanger, which can control the exhaust stream's temperature by lowering it, immediately before the SCR catalyst. After the exhaust stream has flowed through the catalyst section, it enters the remainder of the equipment in the HRSG.

Once the invention described herein is employed, however, it is possible to locate such HC-SCR inside a HRSG, similar to the vanadia titania ammonia SCR catalyst, wherein NOx reduction is achieved by injecting a suitable hydrocarbon, by mixing the injected hydrocarbon with the exhaust stream inside an HRSG and passing this mixture through a HC-SCR catalyst for NOx reduction purposes. U.S. Pat. No. 7,361,321 (herein incorporated by reference) teaches how hydrocarbon(s) can be injected into an exhaust stream from a turbine before a suitable HC-SCR catalyst when used for the purpose of NOx reduction. In such an installation, if CO abatement is required, U.S. Patent Application No. 2006/0228283 (herein incorporated by reference) teaches that a suitable CO catalyst can be located downstream of the HC-SCR catalyst unlike the traditional ammonia SCR case, where the CO catalyst is located upstream of the ammonia injection grid. When HC-SCR technology is applied to combined cycle gas turbines with HRSG, the hydrocarbon injection grid, HC-SCR catalyst and the CO catalyst can all be inside an HRSG. Thus HRSG's can be modified to fit either vanadia titania type catalysts or more modern HC-SCR type catalysts.

A "catalyst section" means a portion of the HRSG which comprises one or more reducing agent injection points, and one or more SCR catalysts; and optionally one or more CO catalysts.

A "CO catalyst" means a catalyst that works to decrease the CO in the exhaust stream.

A "SCR catalyst" means a catalyst that works to decrease $NO_x$ in the exhaust stream. An "HC-SCR" catalyst uses a reducing agent comprising one or more hydrocarbons. An "ethanol-SCR" catalyst uses a reducing agent comprising ethanol. An "ammonia-SCR" uses a reducing agent comprising ammonia and/or an ammonia generating compound (including but not limited to aqueous ammonia and/or urea).

An "air preheater" means equipment that heats air to be mixed with the exhaust stream before exiting the stack.

"Contacting" and "flowing" in the specification and claims both mean that the exhaust is placed in contact with a catalyst.

An "optimal temperature" or "optimal range" means the range of temperature at which the SCR catalyst is most active, resulting in greater than about 90% $NO^x$ conversion at all turbine operating conditions, and does not rapidly degrade, preferably about 715° F.-about 815° F.

The locations given in the specification "before" and "after" are locations along the path in the direction of the exhaust stream.

FIGURES

FIG. 1 is a plot of NOx conversion versus temperature for several prior art hydrocarbon-SCR catalysts disclosed in U.S. Patent Application No. 2006/0228283.

FIG. 2 is a plot of NOx conversion versus temperature for various prior art ammonia-SCR catalysts set forth in Byrne et al., Catalysis Today, Vol. 13, pgs 33-42 (1992) (hereinafter incorporated by reference).

DETAILED DESCRIPTION

Figure 3A:
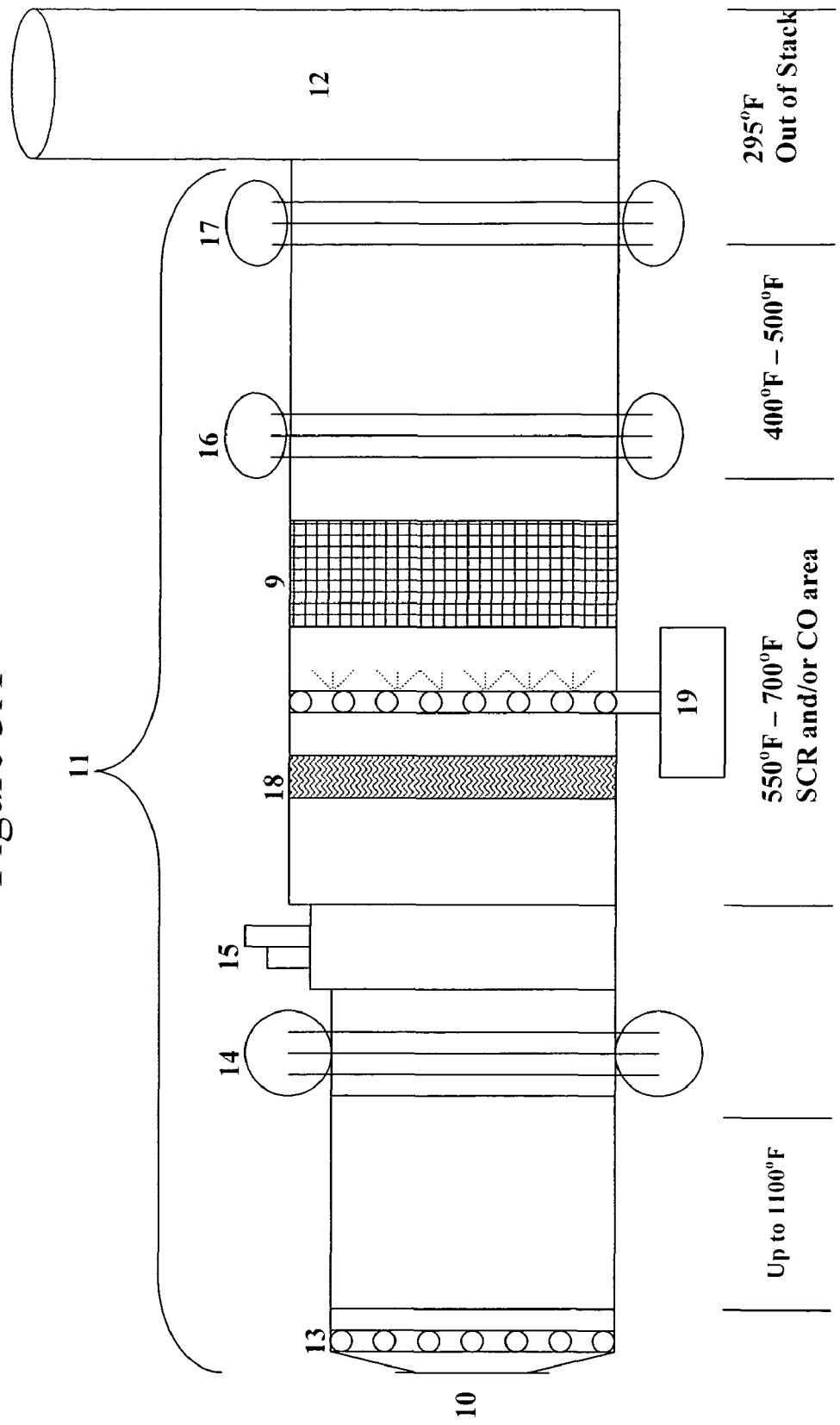
FIG. 3A shows a diagram of a combined cycle plant which includes a HRSG as per a prior art embodiment.

As indicated above, the present invention relates to a means of providing a narrow temperature range inside an HRSG, wherein this narrow temperature range is at the optimum performance window of the SCR catalyst for NOx emission reductions from combined cycle gas turbine applications. This arrangement will also result in lower SCR catalyst usage when compared to the prior art.

Prior art dealt with locating the catalyst inside the HRSG, but neglecting to address the fluctuating loads of the turbines, where the HRSG is expected to deliver a constant amount of steam. However, steam demands and the load on the combustion turbines vary. These variations result in a broader range of exhaust temperature than it is possible to have the SCR catalyst operate to meet certain emission requirements. On Page 910 in the text book on Gas Purification by Arthur L. Kohl and Richard B. Neilsen, $5^{th}$ edition, 1997 (herein incorporated by reference) some of the problems associated with HRSG's and their impact on SCR's are mentioned. Combustion turbine load demands, shifts in steam requirements from HRSG, impact of duct firing on HRSG temperature profile (meaning the temperature all along the HRSG, not just at one point in the HRSG), and changes in performance of HRSG over time, result in vast deviations in the temperature at the SCR catalyst inside the HRSG, which results in reduced catalyst performance, premature degradation of the SCR catalyst and frequent catalyst replacement, excess usage of catalyst, excess usage of reducing agents, and frequent shutdowns to maintain catalysts amongst other things.

Many SCR catalysts have a narrow temperature window of operation at which their performance is best. Standard vanadia titania catalysts perform best when located inside an HRSG, where the exhaust temperature is about 650° F.-about 750° F. Recent work by various research groups suggest that hydrocarbon SCR catalysts perform best in the temperature window of about 715° F.-about 815° F. Providing the desired temperature window for a catalyst inside an HRSG without sacrificing the HRSG performance itself is beneficial for overall catalyst usage and energy efficiency of the combined cycle turbine and HRSG.

FIG. 1 shows a plot of NOx conversion versus temperature for several hydrocarbon SCR catalysts as disclosed in US Patent application (2006/0228283). Several catalysts were made according to the procedure described in that patent application and tested under gas turbine exhaust conditions. Exhaust streams (hereinafter "gas turbine" refers to a combined cycle turbine) typically contains about 25 ppm NOx, about 50 ppm CO, about 5% $CO_2$, about 15% $O_2$, about 10% $H_2O$ and balance nitrogen. Regulations require them to be below 2.5 ppm NOx, meaning 90% or higher NOx conversion is desired.

U.S. Patent Application Publication No. 2006/0228283 teaches that NOx conversion to nitrogen can be achieved by combining two catalysts in hydrocarbon SCR operation especially for gas turbine applications. Ethanol is the preferred hydrocarbon reductant according to this application. The application disclosed the use of a first catalyst a "silver catalyst" followed by a second catalyst called "modifier catalyst". Procedures to prepare such catalysts were also taught in the application. As shown here in FIG. 1, catalysts A, B, C and D were obtained by changing the metal composition of the second catalyst or the "modifier catalyst in a range from 5 wt % to 20 wt %. As taught in the application, tests were conducted using a 2 wt % silver on alumina catalyst as the "first catalyst" and varying modifier catalysts resulting in catalysts A, B, C and D.

In this test, ethanol was used as the hydrocarbon (reducing agent) for removing NOx using such hydrocarbon SCR catalysts. Tests were performed by recording NOx conversion data from a simulated feed gas representative of a exhaust stream, in a temperature range of about 350° C. to about 450° C. (about 662° F.-about 842° F.). As is evident from the plot, most catalysts result in greater than 90% NOx conversion when the temperature is in the range of about 700 to about 800° F. If one were to use this catalyst in a combined cycle application inside an HRSG, it is of obvious benefit to provide the desired range of temperature for such HC-SCR catalysts so that NOx emission reduction targets are met. It is even better if there is no sacrifice to the overall efficiency of HRSG, (which is the desired requirement of steam production) at any given operation condition.

FIG. 2 is a plot disclosed in prior art. This was taken from a paper published by Byrne et al., in Catalysis Today, Volume 13, pages 33-42, year 1992. On page 35, the authors disclose the various types of ammonia SCR catalysts. V/Ti is the most common type of SCR catalysts used in the industry today in HRSG's for combined cycle applications. As can be seen in this figure, the V/Ti catalysts result in greater than 90% NOx conversion in the temperature window of about 325° C. to about 425° C. The chart shows that, if the operation is below about 325° C. or above about 425° C., there is a significant drop in NOx conversion. Ammonia slip also increases significantly when temperature is below about 325° C.

If one were to use such V/Ti catalysts in combined cycle applications, inside the HRSG, given that HRSG operation results in a much broader temperature window (about 300- about 1100° F.), there would be several instances where operation is bound to occur outside the desired operating window of such V/Ti catalysts.

The following two embodiments of modifying a combined cycle turbine and HRSG achieve the primary goal of this invention. This invention creates a zone in the HRSG that has a narrow exhaust stream temperature range which will be better suited and more effective for SCR catalyst performance, and thus offer a unique and improved advantage over current HRSG solutions coupled with SCR catalyst.

Example #1

The temperature of exhaust stream entering the HRSG of a combined cycle combustion gas turbine can be about 600° F. to about 1100° F., more typically about 825° F. to about 1100° F. The amount of exhaust stream entering the HRSG varies considerably depending on the size of the combustion gas turbine used in the application and on varying operating conditions of a particular combustion gas turbine. Even though the amount of exhaust stream may vary, the temperature of this exhaust stream remains within the about 825° F. to about 1100° F. range. This exhaust stream temperature range, however, is too broad and not ideal for existing SCR catalyst technology, thus a much narrower temperature range is desired.

In a typical HRSG located downstream of a combustion gas turbine, saturated steam is produced in one or more heat exchange sections and sometimes superheated steam, or preheated air, or heat-transfer media, etc. are also heated by exchanging heat from the exhaust stream. In any or all cases, the exhaust stream temperature downstream of these heat exchange sections is reduced but current HRSG designs do not produce a narrow or optimal temperature zone within the HRSG.

With the present invention, it is possible to create an optimal, narrower temperature zone for SCR catalyst by-passing one or more heat exchangers for a portion of the exhaust stream leaving the turbine and sending into a cooler temperature zone that is downstream of the heat exchangers. The amount of by-passing required and the location this by-passing equipment would be highly dependent on the steam and electrical operating requirements. The amount of exhaust stream to by-pass the heat exchanger is controlled using additional ducting, damper(s) and/or injection nozzles to take hotter exhaust stream and by-pass it around a particular heat exchange surface.

The result is that the exhaust stream temperature entering the SCR catalyst location is now controlled within a narrow temperature band by controlling the amount of hotter exhaust stream diverted upstream of the SCR catalyst location.

FIG. 3A shows an embodiment of the prior art. A hot exhaust stream from the gas turbine (10) passes through the HRSG (11) and then to the stack (12). FIG. 3A also shows a duct burner (13) located at the entrance of the HRSG. The temperature of the exhaust stream going through the HRSG is different in duct firing mode versus when there is no duct firing. The temperature of the exhaust also varies as the turbine load varies. The first heat exchanger or the high pressure boiler (14) is upstream of the super heater section (15). An additional heat exchanger (16) known as the low pressure boiler is located upstream of the economizer (17). The CO catalyst (18), the reducing agent injection grid (19) and the SCR catalyst (9) are located inside the HRSG, typically in a location between the super heater section (15) and the low pressure boiler (16). In some installations where there is an intermediate pressure section (not shown in FIG. 3A), the CO and SCR catalysts are located inside this intermediate pressure section. The CO and SCR catalysts are subjected to a broad range of temperature depending on operating conditions of the turbine and/or the duct heater inside the HRSG, and steam requirements of the plant from the HRSG. Typical exhaust temperature in the catalyst zone in such an arrangement is in the range from about 425° F. to about 700° F., which is below the optimum temperature of SCR catalysts.

Figure 3B:
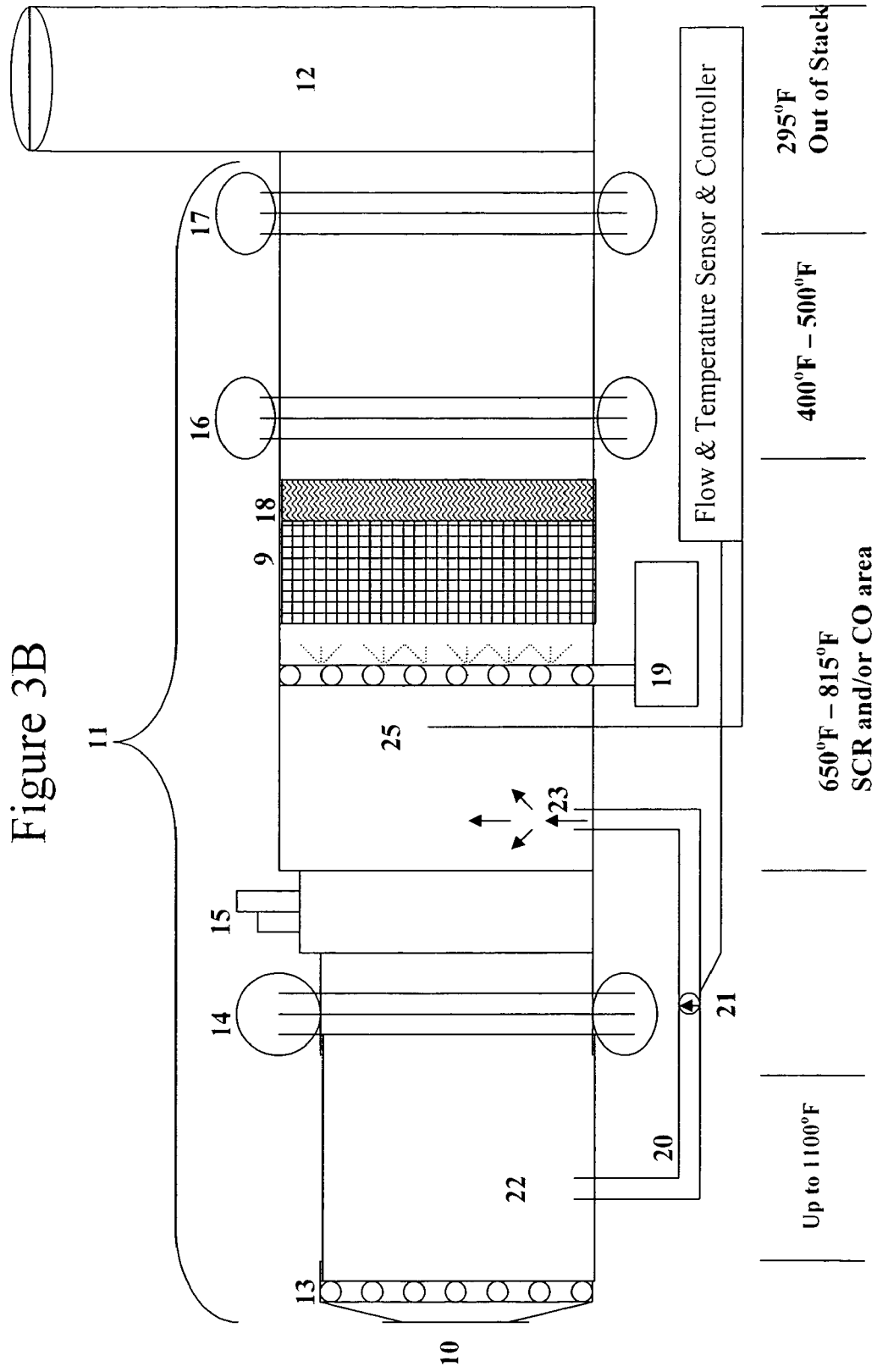
FIG. 3B shows a diagram of a combined cycle plant with a HRSG as per an embodiment of this invention.

FIG. 3B shows an embodiment of the present invention. Hot gas from point Z (22) is bypassed outside the HRSG using a duct (20). The difference from prior art to this embodiment of the invention is the use of the duct (20) to allow hot gas from the exhaust stream to flow directly to the catalyst section at (23), bypassing the first heat exchanger (high pressure boiler) (14) and the super heater (15). The flow through this duct (20) can be controlled by the use of a damper (21). The hot gases (exhaust stream) directly from the exhaust stream can be injected using injection nozzles (at 23) typically used to inject hot gases. The amount to be injected can also be controlled. The temperature of the mixed exhaust stream reaching the catalyst can be controlled to optimize the catalyst performance. The flow of the exhaust through this bypass and the temperature upstream of the catalyst can be measured and controlled using any suitable measuring and control devices and systems known in the art. Any known means of regulating the flow through this by-pass section can be used to arrive at a narrow temperature range at the catalyst section (which begins at 18). Advantageously, the duct (20) can be located on any side (top, left and/or right are preferred) to bypass the heat exchanger and superheater and allow hot exhaust streams into the catalyst section of the HRSG. One or more ducts can be used, to bring the exhaust stream to the desired catalyst operating temperature. When one or more ducts are used, they can be controlled together or independently. When more than one duct is used and are controlled either together or independently, they may have one or more exhaust stream injectors. The exhaust stream injector(s) can have one or more exhaust stream injection nozzles. The amount of exhaust injected and the rate injected through the injection nozzles are controlled so that during all turbine operations, the catalyst section (from (18) to (25)) is always at a constant narrow temperature range (the optimal temperature range) for the SCR catalyst.

For example, in one embodiment, when HC-SCR catalyst is used, the temperature in the catalyst section is about 715° F. to about 815° F., by controlling the exhaust bypass.

In another embodiment, an ammonia SCR catalyst is used, the CO catalyst (18) is located upstream, preferably immediately upstream, of the ammonia injection grid (19) but after the temperature sensor at (25).

Example #2

Figure 4A:
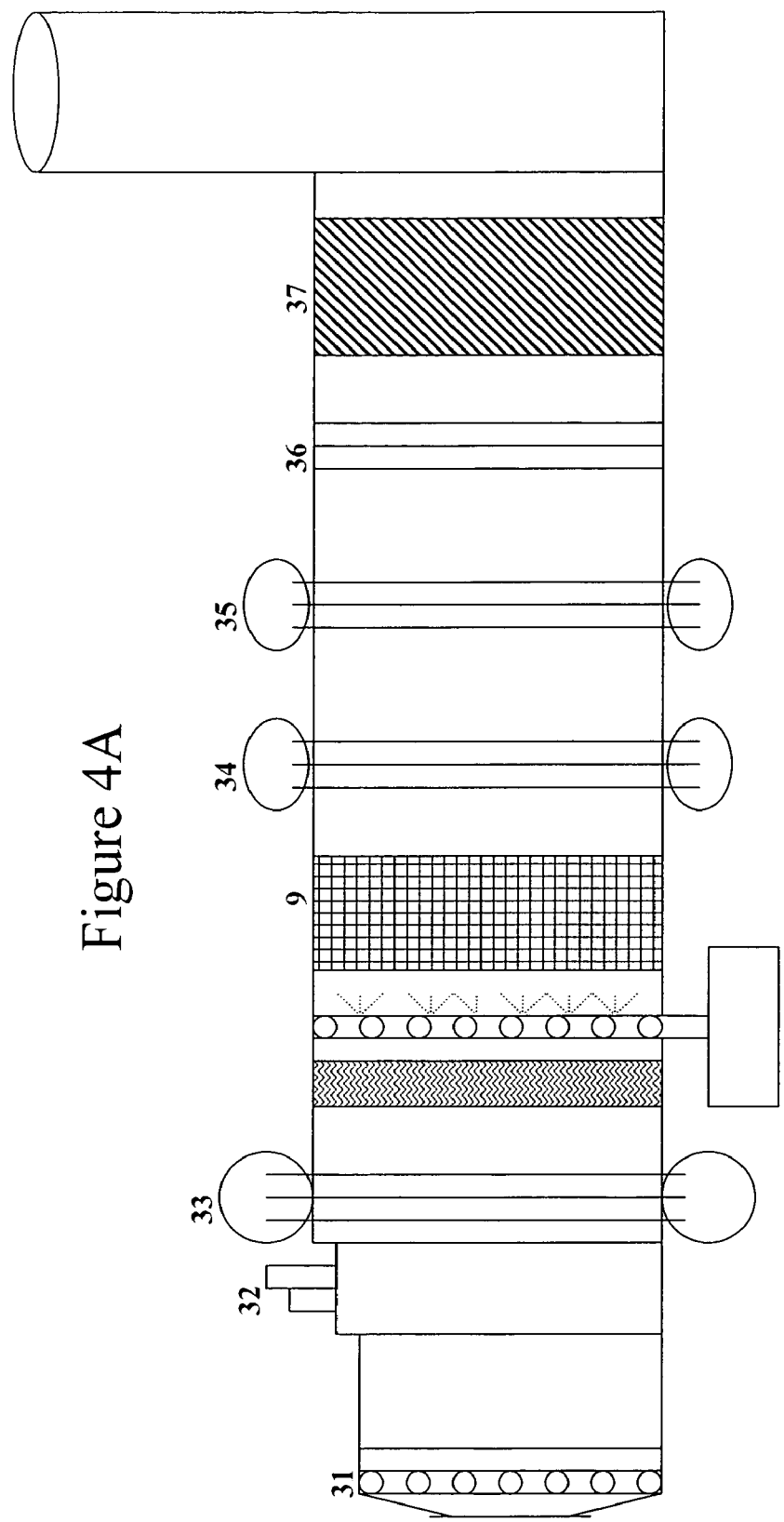
FIG. 4A shows a diagram of a combined cycle plant with a HRSG as per a prior art embodiment.

Basic components of the typical HRSG are shown in FIG. 4A. They are: Duct Firing Burners (31), Superheater Steam Bank (32), High Pressure Boiler Bank (33) Intermediate Pressure Boiler Bank (34), Low Pressure Boiler Bank (35), Economizer (36), and Air Preheater (37).

Under this invention, the basic HRSG components are arranged to consistently produce an exhaust stream temperature of around 765° F. plus or minus 50° F. at a particular location in the HRSG. Exhaust stream temperature may be raised (very rarely required) via duct burners, or lower (mostly required) via a heat exchange section.

An embodiment of the present invention produces a fixed exhaust downstream of any particular heat exchanger with the HRSG system. The use of a duct burner can generate excessive temperatures downstream of a particular heat exchanger (e.g. without limitation a tube bank), which can limit or reduce the effectiveness of pollution control catalyst systems. This invention addresses the problem of higher or lower than ideal temperatures that exist in the exhaust stream flowing through a HRSG with one or more duct burners. By installing a heat exchanger (e.g. without limitation a tube bank) upstream of the SCR catalyst, and by controlling the heat absorbed by this heat exchanger, the temperature upstream of the SCR catalyst can be kept to a fixed value that is the optimal temperature range.

Figure 4B:
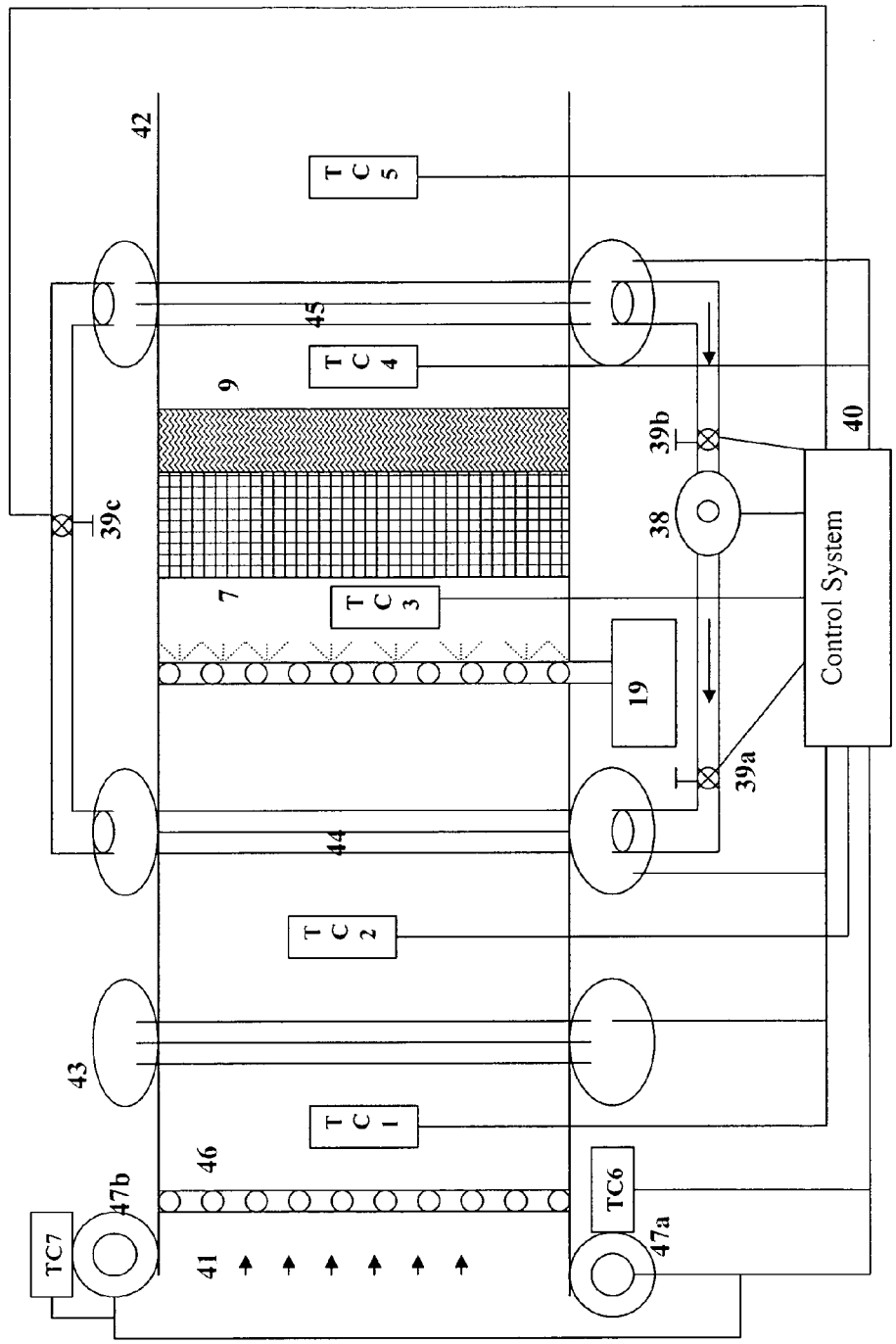
FIG. 4B shows a diagram of a combined cycle plant with a HRSG modified as per an embodiment of this invention.

In FIG. 4B, such an embodiment is shown. The invention embodied therein comprises a heat recovery steam generator (HRSG) generally designated (42) having an inlet plenum (41) spanned by a duct burner (46) and supplied with exhaust from a turbine. HRSG includes, for example, a high pressure drum (43), and associated heat exchanger surfaces including other heat exchangers (44 and 45), in a conventional manner. The exhaust gases are emitted to atmosphere via stack after the heat is removed and emissions are below permit limits.

Heat exchanger bank (44) is in a dry state with no fluid circulating through this tube bank until the duct burners (46) are about ready to be started. Just before the duct burners (46) are fired, the circulation pump (38) and control valve(s) (39a, b and/or c and any combinations thereof) become active. They may be controlled by a control system, such as control system (40) which may be digital, to start flowing fluid through this tube bank (44) to absorb heat from the exhaust so that a pre-set temperature is constantly maintained downstream of this tube bank (44) and upstream of the catalyst. The control system (40) achieves the fixed temperature regulation by evaluating various process conditions and determining how much fluid to distribute across this tube bank (44). In some but not all embodiments, the fluid leaving this tube bank would remain a liquid because the heat picked up by this fluid would leave via steam that boils out through boiler (45).

As an alternative, this bank (44) can be designed to become another steam generating bank, or could be designed to transfer heat via one of various other types of heat transfer media, such as Dowtherm. In all cases, the purpose is the same, which is generating a constant $T_c$ temperature in the catalyst section no matter how much duct firing heat is being generated. Typically, when the duct burners (46) are off, the need to circulate and absorb heat from the tube bank (44) is no longer necessary and the bank may be purged of fluid and allowed to exist in a dry state that no longer absorbs and transfers heat from this particular location in the HRSG. The catalyst operates in an optimal temperature zone because the HRSG was designed to create an optimal temperature when duct firing was not present or was present. Alternatively, the tube bank (44) may be used and controlled to achieve a fixed temperature in the exhaust while the duct burners are on and/or off.

In one embodiment shown in FIG. 4B, the system is shown to have a HC-SCR catalyst (7) and a CO catalyst (9), wherein the CO catalyst (9) is downstream of HC-SCR catalyst (7).

In another embodiment, the system can be used with ammonia-SCR catalyst. If a CO catalyst is used, it is preferably located upstream of the reducing agent injection grid, but after a heat exchanger.

As is known in the art, various measurement and control points are used in the control system (40) for example, without limitation flow, temperature and turning on and off. Thermocouples $T_{C1}$ through $T_{C7}$ or any combination thereof measure temperature at each respective location. The heat exchangers 43, 44 and 45 (preferably tube banks), the circulation pump (38) and valves (39a, 39b and 39c or any combination thereof) can be controlled using the control system (40).

In one embodiment, there may also be air dilution blowers (47a and 47b). If for any reason, the entire HRSG is turned off and the turbine needs to be operated in a simple cycle manner, the control system (40) will still be able to provide the optimum temperature in the catalyst section (7) to (9) as required. In such a situation, the air dilution blowers (47a and/or 47B) will be turned on automatically by the control system (40) when the HRSG is turned off. The air dilution blowers (47a and 47b), ensure that the exhaust stream is cooled to the optimal temperature in the catalyst section, allowing the turbine to operate in simple cycle mode, while still being able to meet all emission reduction requirements. Since HRSG is non-operational in a simple cycle mode, there are no fluids circulating in tube banks (43), (44) and (45).

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A method of maintaining an optimal temperature for a catalyst section in a heat recovery steam generation system comprising:
    Placing a first portion of a gas turbine exhaust stream in a path of a first heat exchanger;
    Diverting at least one second portion of the exhaust stream to avoid the first heat exchanger, wherein the at least one second portion combines with the first portion after the first heat exchanger; and
    Contacting the combined first and second portions with a catalyst section, wherein the catalyst section comprises one or more reducing agent injection points, one or more SCR catalysts, and one or more CO catalysts disposed upstream of said one or more SCR catalysts and downstream of said one or more reducing agent injection points.

2. The method of claim 1 wherein the catalyst section has a temperature of about 715° F. to about 815° F., and wherein a temperature of said at least one second portion is greater than a temperature of said combined first and second portions.

3. The method of claim 1 further comprising directing the exhaust stream through one or more duct burners prior to said diverting.

4. The method of claim 1 wherein the diverting includes diverting said at least one second portion to avoid contacting said at least one second portion with one or more superheaters.

5. The method of claim 1 wherein the contacting comprises
    Injecting a reducing agent into the combined portions via the injection points; and
    Flowing the combined portions into one or more SCR catalyst, and
wherein the SCR catalyst is one or more of a HC-SCR, ethanol-SCR or ammonia-SCR catalyst and the reducing agent comprises one or more hydrocarbon, ethanol, ammonia, aqueous ammonia, an ammonia generating compound, urea and combinations thereof.

6. The method of claim 1 further comprising contacting said combined first and second portions with a second heat exchanger disposed downstream of the catalyst section.

7. The method of claim 2 wherein the first portion of said exhaust gas prior to said first heat exchanger has a temperature of about 825° F. to about 1100° F.

8. The method of claim 1 wherein the SCR catalyst is a zeolite-based catalyst.

9. A method of maintaining an optimal temperature for a catalyst section in a heat recovery steam generation system comprising:
    Placing a first portion of a gas turbine exhaust stream in a path of a first heat exchanger;
    Diverting at least one second portion of the exhaust stream to avoid the first heat exchanger and to avoid contacting said at least one second portion with one or more superheaters, wherein the at least one second portion combines with the first portion after the first heat exchanger; and
    Contacting the combined first and second portions with a catalyst section, wherein the catalyst section comprises one or more reducing agent injection points and one or more SCR catalysts.

10. The method of claim 9 wherein the catalyst section has a temperature of about 715° F. to about 815° F., and wherein a temperature of said at least one second portion is greater than a temperature of said combined first and second portions.

11. The method of claim 10 wherein the first portion of said exhaust gas prior to said first heat exchanger has a temperature of about 825° F. to about 1100° F.

12. The method of claim 9 further comprising directing the exhaust stream through one or more duct burners prior to said diverting.

13. The method of claim 12 wherein said one or more duct burners operate intermittently to produce an optimal temperature in the catalyst section.

14. The method of claim 9 wherein the contacting comprises
    Injecting a reducing agent into the combined portions via the injection points; and
    Flowing the combined portions into one or more SCR catalyst, and
wherein the SCR catalyst is one or more of a HC-SCR, ethanol-SCR or ammonia-SCR catalyst and the reducing agent comprises one or more hydrocarbon, ethanol, ammonia, aqueous ammonia, an ammonia generating compound, urea and combinations thereof.

15. The method of claim 9 further comprising contacting said combined first and second portions with a second heat exchanger disposed downstream of the catalyst section.

16. The method of claim 9 wherein the catalyst section further comprises one or more CO catalysts disposed downstream of said one or more SCR catalysts.

17. The method of claim 16 wherein the contacting comprises
    Injecting a reducing agent into the combined portions via the injection points; and
    Flowing the combined portions into one or more SCR catalysts.

18. The method of claim 17 wherein the placing step further comprises placing the first portion in a path of the one or more superheaters.

19. The method of claim 17 further comprising directing the exhaust stream through one or more duct burners first.

20. The method of claim 9 wherein the SCR catalyst is a zeolite-based catalyst.

* * * * *